US010145403B2

United States Patent
Dannheisig et al.

(10) Patent No.: US 10,145,403 B2
(45) Date of Patent: Dec. 4, 2018

(54) JOINING PROCESS, MANUFACTURING PROCESS, ARRANGEMENT OF COMPONENTS AND VEHICLE SEAT

(71) Applicant: Johnson Controls GmbH, Burscheid (DE)

(72) Inventors: Andreas Dannheisig, Sassenberg (DE); Carina Schulze, Hattersheim (DE); Dustin Flock, Köln (DE); Bernd Gross, Langefeld (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 535 days.

(21) Appl. No.: 14/541,967

(22) Filed: Nov. 14, 2014

(65) Prior Publication Data
US 2015/0139720 A1    May 21, 2015

(30) Foreign Application Priority Data

Nov. 15, 2013    (DE) .................. 10 2013 019 050

(51) Int. Cl.
*C09J 5/06* (2006.01)
*C09J 11/02* (2006.01)
(Continued)

(52) U.S. Cl.
CPC .......... *F16B 12/04* (2013.01); *B32B 37/1284* (2013.01); *B32B 37/18* (2013.01);
(Continued)

(58) Field of Classification Search
CPC .. F16B 11/006; C09J 5/06; C09J 11/02; C09J 11/04; C09J 11/06
See application file for complete search history.

(56) References Cited

U.S. PATENT DOCUMENTS

| | | | |
|---|---|---|---|
| 3,616,174 A | 10/1971 | Atkins | |
| 3,795,047 A * | 3/1974 | Abolafia | ............... H05K 3/462 156/273.9 |
| 4,545,840 A | 10/1985 | Newman et al. | |

(Continued)

FOREIGN PATENT DOCUMENTS

| | | |
|---|---|---|
| DE | 17 19 529 A | 8/1971 |
| DE | 102 10 661 A1 | 5/2003 |

(Continued)

OTHER PUBLICATIONS

Office Action dated Jun. 26, 2014, in corresponding German application No. 10 2013 019 050.9, 6 pages.
(Continued)

*Primary Examiner* — Michael P Ferguson
(74) *Attorney, Agent, or Firm* — Foley & Lardner LLP

(57) ABSTRACT

A joining process is proposed for connecting a first component to a second component, whereby in a first process the first component and the second component and an adhesive material arranged between the first and the second component are prepared, whereby in a second process the first and the second components are pressed together and whereby in a third process the adhesive material is hardened and further whereby spacing means are added to the adhesive material and these are at least partially resorbed in the third process by the adhesive material.

9 Claims, 1 Drawing Sheet

(51) Int. Cl.
  *F16B 12/04* (2006.01)
  *C09J 5/00* (2006.01)
  *F16B 11/00* (2006.01)
  *B32B 37/12* (2006.01)
  *B32B 37/18* (2006.01)

(52) U.S. Cl.
  CPC ............... *C09J 5/00* (2013.01); *F16B 11/006* (2013.01); *B32B 2605/00* (2013.01); *Y10T 403/477* (2015.01)

(56) References Cited

U.S. PATENT DOCUMENTS

| | | | | |
|---|---|---|---|---|
| 5,008,304 | A * | 4/1991 | Kmentt | A61C 7/12 523/118 |
| 5,232,962 | A | 8/1993 | Dershem et al. | |
| 5,470,416 | A * | 11/1995 | Herring, Jr. | B21D 39/021 137/268 |
| 6,074,506 | A | 6/2000 | Herring et al. | |
| 8,181,327 | B2 * | 5/2012 | Apfel | F16B 5/02 156/92 |
| 2009/0214856 | A1 * | 8/2009 | Gomi | B29C 65/1406 428/332 |
| 2010/0143722 | A1 * | 6/2010 | Anderson | B29C 66/721 428/411.1 |
| 2010/0266809 | A1 * | 10/2010 | Schulenburg | B62D 27/026 428/124 |
| 2012/0169107 | A1 * | 7/2012 | Sakkinen | B23K 26/32 297/452.18 |

FOREIGN PATENT DOCUMENTS

| | | |
|---|---|---|
| DE | 1020100 44 115 A1 | 5/2012 |
| EP | 0 268 352 A1 | 5/1988 |
| WO | WO-2009/129923 A1 | 10/2009 |
| WO | WO-2011/073422 A2 | 6/2011 |
| WO | WO-2012/065819 A1 | 5/2012 |

OTHER PUBLICATIONS

Search Report in corresponding European Application No. 14 19 2858.0 dated Mar. 30, 2015, 6 pages.

* cited by examiner

JOINING PROCESS, MANUFACTURING PROCESS, ARRANGEMENT OF COMPONENTS AND VEHICLE SEAT

CROSS REFERENCE TO RELATED APPLICATIONS

The present application claims priority to German Patent Application No. 10 2013 019 050.9 filed on Nov. 15, 2013, the entire disclosure of which is incorporated herein by reference.

STATE OF THE ART

The present invention relates to a joining process. Joining processes of this type are generally known and serve to join two structural components together permanently by means of an adhesive bond, It is also known that such structural components can be provided with beading or for rigid spacing means in glass to be added to the adhesive in order to achieve a specific layer thickness of the adhesive.

The inclusion of beading into the structural component is comparatively expensive and requires the use of structural components that can be provided with such beading. Moreover, the use of spacing means made of glass is disadvantageous, as frequently such items can shatter as a result of the high compression forces that can develop between the components. Furthermore, such glass spacing means do not bond permanently with the adhesive, with the result that the bond between the components in the area of the spacing means is weakened.

DISCLOSURE OF THE INVENTION

It is an aim of the present invention to propose a joining process based on an adhesive bond which enables a highly effective adhesive bond to be created between two components with a specific adhesive layer thickness without any weaknesses appearing in the adhesive layer.

This aim is achieved by a joining process for bonding a first component with a second component, whereby in a first stage the first component, the second component and an adhesive material arranged between the first and the second component are made ready, whereby in a second stage the first and the second components and pressed together and whereby in a third stage the adhesive material hardens, whereby further the spacing means are added to the adhesive material, which are in the third stage at least partially resorbed by the adhesive material.

In relation to the present state of the art, the joining process according to the present invention has the advantage that, in order to obtain the specific thickness of the adhesive layer, spacing means are used in the adhesive layer, which are at least partially resorbed by the adhesive material and thus form a permanent bond with a high loading capacity with the adhesive material. Advantageously, the adhesive bond is not weakened by the inclusion of the spacing means. The result is therefore the creation of a high strength adhesive bond between the two components with a specific thickness of the adhesive layer, without any weaknesses arising in the adhesive layer. The hardening of the adhesive material during the third process takes place preferably with the introduction of heat. The adhesive material comprises in particular an adhesive agent, which can typically resorb drawing oils in the hardening heat of the adhesive agent without compromising the final strength. The spacing means are formed in such a way that their materials are at least partially resorbed into the adhesive material under the influence of the hardening heat of the adhesive agent.

Advantageous embodiments and further developments of the invention can be found in the subordinate claims and also in the Description with reference to the drawings.

According to one preferred embodiment of the present invention, it is proposed that in the third process the adhesive material is dried by means of cathodic immersion painting process. It can be envisaged that the first and the second components are immersed in an immersion bath. In the subsequent heating stage, the adhesive material is hardened with a partial resorption of the spacing means.

In a preferred further development of the present invention it is proposed that rigid or semi-rigid spacing means should be added to the adhesive material and/or that spacing means in a spherical form should be added to the adhesive material. Advantageously, the in particular rigid or semi-rigid spacing means in a spherical form serve to separate the first and the second component until the adhesive material has hardened. In this manner, the specific thickness of the adhesive layer is obtained.

In a further preferred further development of the present invention it is proposed that the spacing material should be in plastic, preferably a monomer or a polymer. It is in particular preferred for the spacing material to be made of a pre-polymer and for this to be mixed with the adhesive agent. In relation to the state of the art, the spacing means made from plastic has the advantage that during the second process it does not shatter. Moreover, spacing means made from plastic combines directly with the adhesive means that has hardened in the third process thereby producing an adhesive bond between the first and the second component that has an especially high mechanical strength.

In an alternative further development of the present invention it is proposed that the spacing means is made from a support material coated with a binding material. The support material includes typically a metallic material. For example, the spacing means is made from small aluminium balls which are coated with the binding material. The binding material that is combined with the support material is then resorbed during the third process by the adhesive material and combines with the adhesive material forming a cohesive bond. Advantageously, the support material permits comparatively high pressures between the first and the second component during the second process. It can be envisaged that the binding material is activated in the course of an intermediary process that takes place before the second process. It can be envisaged that the support material undergoes a surface reaction with the binding material or is activated in advance in the adhesive material by means of a surface treatment, so that under the effect of heat a significantly higher bonding to the adhesive material and to the elements to be joined, that is to say the two components, takes place.

According to a further preferred further development of the present invention, it is proposed that the spacing means is at least partially dissolved and/or chemically bonded in the adhesive material. This is achieved in particular in that the spacing means is resorbed or dissolved and/or chemically bonded in the adhesive material during the hardening heat of the adhesive material occurring in the third process. It can be envisaged that the third process takes place in an immersion bath for the execution of a cathodic immersion painting. According to a further preferred further development of the present invention, it is proposed that, in the first process, the adhesive material is applied to the first and/or second component, whereby the spacing means are added to the adhesive material during the application of the adhesive material to the first and/or the second component. It can be envisaged that the spacing means are only mixed in during the application stage or even that an adhesive material is prepared in advance with the spacing means mixed in previously, which can then be directly applied to the first and/or the second component.

According to a further preferred further development of the present invention, it is proposed that in the first process the first component is prepared in the form of a first plate metal component and the second component is prepared in the form of a second plate metal component. Advantageously, by means of the joining process according to the present invention, these plate metal components can be cohesively bonded together.

A further aim of the present invention is a manufacturing process to manufacture a vehicle seat using the first and the second component, whereby the first component is joined to the second component by means of the joining process according to the present invention. In this way, advantageously several components of the vehicle seat can be joined together and a high-strength adhesive bond with a specific thickness of the adhesive thickness can be achieved between them.

A further aim of the present invention is a specific arrangement with a first component and a second component, whereby the first component and the second component are joined together at an adhesion point, whereby a hardened adhesive material is arranged at the said adhesion point, whereby the hardened adhesive material is at least partially replaced by spacing means resorbed by the adhesive material. The arrangement of the components in accordance with the present invention has, in relation to the state of the art, the advantage that, in spite of the fact that the thickness of the adhesive layer generated by the spacing means is significantly more stable, the at least partial resorption of the spacing means in the adhesive material does not lead to any weakening of the adhesive bond. As a result of the resorption, in particular the spacing means is at least partially dissolved and/or chemically bound in the adhesive material, providing high strength in the area of the adhesive bond. Moreover, the arrangement of the components is comparatively fast, simple and thus cost effective. The spacing means are preferably in the form of spherical, rigid or semi-rigid spacing means. The first component is preferably in the form of a first plate metal component and the second in the form of a second plate metal component.

According to a further preferred further development of the present invention, it is proposed that the spacing means are either in plastic, preferably containing a monomer or a polymer, or that alternatively the spacing means comprise a support material, preferably small aluminium balls, which are coated with a bonding agent.

A further object of the present invention is a vehicle seat with an arrangement of the components according to the present invention.

Further details, features and advantages of the present invention will be apparent from the drawings and also from the following Description of preferred embodiments in conjunction with the drawings. The drawings solely illustrate typical embodiments of the present invention and do not therefore limit its scope.

EMBODIMENTS OF THE PRESENT INVENTION

In the different drawings, the same parts are always given the same reference numbers and for this reason as a rule they are only referred to or mentioned once.

Figure 1A:
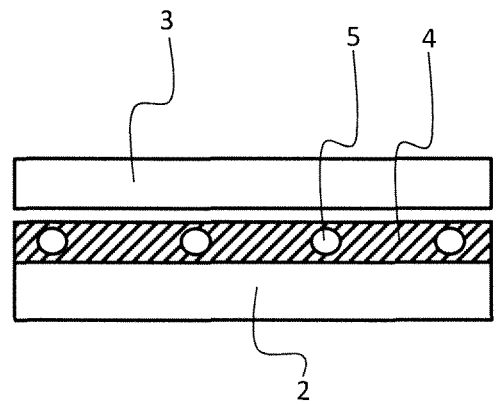
FIGS. 1a, 1b and 1c illustrate schematically a joining process in a typical embodiment of the present invention and also an arrangement of components according to a typical embodiment of the present invention.
Figure 1B:
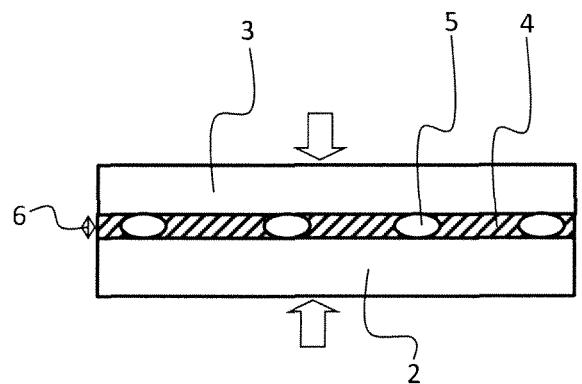
Figure 1C:
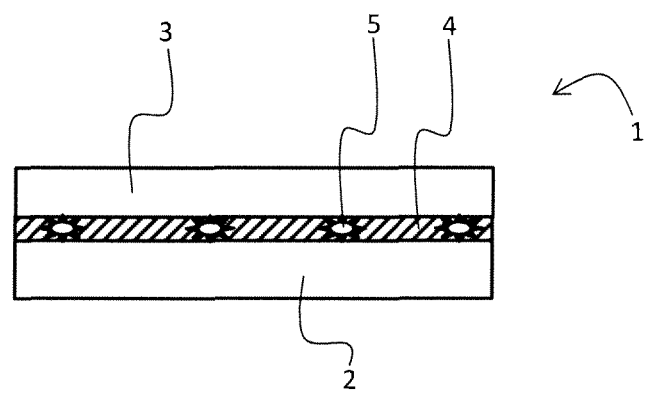

FIGS. 1a, 1b and 1c show in schematic form respectively a joining process for the manufacture of an arrangement of components 1 according to a typical embodiment of the present invention. FIG. 1c also shows schematically the finally assembled arrangement of components 1 according to the typical embodiment of the present invention.

In a first process, illustrated in FIG. 1a, a first component 2 and a second component 3 to be attached to the component 2, are prepared. The first component 2 and the second component 3 are respectively sheet metal pieces. A liquid, or at least a viscous material 4, is applied to one side of the first component 2 facing the second component 3. Spacing means 5 in the form of small, rigid or semi-rigid small plastic balls, preferably made from a monomer or a pre-polymer, are added to the adhesive material 4. It is envisaged that the spacing means 5 are mixed with the adhesive material 4 before that application of the latter or that the spacing means 5 are mixed with the adhesive material 4 during the application of the adhesive material 4 to the first component 2.

FIG. 1b illustrates a second process, in which the first and the second components 2, 3 are pressed together in such a way (see arrows) that the adhesive material 4 mixed with the spacing means is arranged between the first and the second components 2, 3. The rigid or semi-rigid spacing means 5 ensure that the resulting adhesive layer of adhesive material is not completely pressed together, but that a pre-defined space 6 is left between the first and the second component 2, 3. This space also ensures a specific thickness of the adhesive layer in the presence of high pressing forces.

Finally, the adhesive material is hardened in a third process, shown in FIG. 1c. Here heat is introduced into the arrangement of the components 1 and 2, for example in an immersion bath with a cathodic immersion process (KTL). The formation of the spacing means 5 in the form of small plastic balls, preferably made from a pre-polymer, leads to the spacing means 5 being resorbed in the adhesive material 5. In this way, a chemical bond is created between the spacing means 5 and the hardened adhesive material 4, whereupon a high-strength adhesive bond is created between the first and the second component 2, 3 without any weaknesses arising in the adhesive layer.

Alternatively, it can be envisaged that the spacing means 5 consist of small aluminium balls coated with a bonding agent, whereby in the third process the bonding agent adhering to the small aluminium balls is resorbed in the adhesive material 4, so that here too an effective bond is created between the spacing means 5 and the adhesive material 4.

The arrangement 1 described above and shown in FIG. 1c is preferably part of a vehicle seat that is not shown here.

REFERENCE LIST

1. Arrangement of components
2. First component
3. Second component
4. Adhesive material
5. Spacing means
6 Distance.

The invention claimed is:

1. A joining process for joining a first sheet metal component with a second sheet metal component, comprising:
   in a first process, the first component and the second component being arranged with an adhesive material therebetween, wherein spacers are added to the adhesive material, the spacers comprising an aluminum support material and a binding material that is coated on and adheres to the support material, and wherein the support material and the binding material of the spacers is activated in an intermediary surface treatment process in order to activate the support material before the spacers are added to the adhesive material;
   in a second process, the first and the second components being pressed together; and
   in a third process, introducing a hardening heat via cathodic immersion painting and subsequently heating to harden the adhesive material, wherein the adhesive material comprises an adhesive agent that is configured to resorb, drawing oils under the hardening heat without compromising the final strength, and wherein the binding material of the spacers is at least partially resorbed or dissolved by the adhesive material due to the introduction of the hardening heat and thus the spacers are chemically bonded with the adhesive material.

2. The joining process according to claim 1, wherein rigid spacers are added to the adhesive material and/or wherein spacers in a spherical form are added to the adhesive material.

3. The joining process according to claim 1, wherein, in the first process, the adhesive material is applied to the first and/or the second component wherein, the spacers are added to the adhesive material while the adhesive material is being applied to the first and/or the second component or prior to the application of the adhesive material to the first and/or second component.

4. A manufacturing process for the manufacture of a vehicle seat with a first component and a second component, wherein the first component is joined to the second component by the joining process according to claim 1.

5. The joining process according to claim 1, wherein the spacers are semi-rigid spacers.

6. An arrangement of components comprising:
   a first sheet metal component;
   a second sheet metal component; and
   an adhesive material, wherein the adhesive material is mixed with spacers, the spacers comprising an aluminum support material and a binding material that is coated on and adheres to the support material, and wherein the support material and the binding material of the spacers is activated in an intermediary surface treatment process in order to activate the support material before the spacers are added to the adhesive material;
   wherein the first component and the second component are joined together at a joining point and wherein the adhesive material is arranged at the joining point and is hardened with a hardening heat via cathodic immersion painting and subsequently heating, and
   wherein the adhesive material comprises an adhesive agent that is configured to resorb, drawing oils under the hardening heat without compromising the final strength, and wherein the binding material of the spacers is at least partially resorbed or dissolved by the adhesive material due to the introduction of the hardening heat and thus the spacers are chemically bonded with the adhesive material.

7. The arrangement of components according to claim 6, wherein the spacers are in the form of spherical or rigid spacers.

8. A vehicle seat having the arrangement of components in accordance with claim 6.

9. The arrangement of components according to claim 6, wherein the spacers are semi-rigid spacers.

* * * * *